United States Patent [19]

Gilchrist

[11]  4,218,296
[45]  Aug. 19, 1980

[54] PROCESS FOR ELECTROCOATING AQUEOUS DISPERSIONS OF CATHODIC RESINS

[75] Inventor: Allan E. Gilchrist, Westlake, Ohio

[73] Assignee: SCM Corporation, New York, N.Y.

[21] Appl. No.: 935,539

[22] Filed: Aug. 21, 1978

[51] Int. Cl.$^2$ .................... C25D 13/06; C25D 13/10
[52] U.S. Cl. .................................................. 204/181 C
[58] Field of Search .................................... 204/181 C

[56] References Cited

U.S. PATENT DOCUMENTS

| | | | |
|---|---|---|---|
| 3,682,814 | 8/1972 | Gilchrist | 204/181 C |
| 3,869,366 | 3/1975 | Suzula | 204/181 C |
| 4,076,676 | 2/1978 | Sommerfeld | 204/181 C |

Primary Examiner—Howard S. Williams
Attorney, Agent, or Firm—Merton H. Douthitt; Jerry K. Mueller, Jr.

[57] ABSTRACT

Cathodically electrodepositable resin having sufficient cationogenic sites to form, when enough of such sites are ionized, a stable aqueous dispersion, is dispersed in water with anionogen satisfying at least the requisite number of such sites for generating such stable dispersion. The anionogen is proportioned to supply as the satisfying anionic moieties $C_{1-4}$ fatty acid anions and $H_2PO_4$—anions in a ratio of about 0.25:1 to 5:1. When such sites are from ionizable amino functionality, a mixture of carboxylic acid (preferably acetic) and orthophosphoric acid is the anionogen, and such acids are proportioned so that their primary acid hydrogens are not substantially in excess of all the ionizable base functionality present. The dispersion can be used for various coating purposes, but is particularly notable for its use in cathodic electrocoating of iron and steel cathodic substrates using iron and steel equipment without appreciable staining and discoloration of the applied coating, while also suppressing corrosion of containing and processing equipment.

8 Claims, No Drawings

PROCESS FOR ELECTROCOATING AQUEOUS DISPERSIONS OF CATHODIC RESINS

This invention relates to a process for preparing aqueous dispersions of cathodic resin, cathodic electrocoating bath containing same, process for replenishing said bath, and cathodic electrocoating process using said bath.

Formulation of such aqueous dispersions (usually pigmented) for electrocoating of cathodically-charged workpieces is a well known art in active development since about 1964. Most of the equipment (tanks, filters, pipes, etc.) and most of the workpieces to be coated contain a great deal of iron or steel, i.e. they are "ferrous" or "ferruginous". At the normally used voltages (50–300 d.c. volts), the cathodic electrocoating of such workpieces was expected at first to be more favorable for suppression of iron staining of the coating, particularly where whites and pastels were involved.

However, in actual field practice with aqueous cathodically attractable resinous dispersions, such has not been the case. Iron staining or discoloration of the coating usually results. This has caused users to resort to corrosion-proof equipment such as plastic-lined tanks, etc., but the problem persists even when organic acids such as acetic, lactic, and the like are used.

Thus, the great misconception about cathodic electrocoating was to the effect that no iron will get into the coating because iron will be plated out on the cathode. However, this applies only to the working cathodic electrode surface where iron will not be dissolved. The fact is that free iron has very little tint strength and, in the amounts involved, it would cause little or no trouble. Discoloration and staining comes from water soluble, chromatic (coloring) iron-bearing (e.g. $Fe^{+++}$) salt that is a stain or is carried into the deposit from the bath, both as pigment or dissolved in the resin dispersion itself. Where an iron substrate is being coated, soluble iron can come from several sources. From such object to be coated it comes from:

(a) any surface introduced into the bath when DC power is not applied;

(b) any uncoated surfaces in contact with the aqueous acidic bath dispersion, especially during draining after the coating operation;

(c) electrically shielded, partially enclosed surfaces in the bath will form an interior anode and a cathode; the anode portion actively will add iron to the bath; (this situation occurs while the active cathode surface is being coated.)

(d) any poorly-rinsed and especially any poorly-drained interior or hidden surfaces of the object being coated can carry iron salts (which may be soluble in the bath dispersion) into the electrocoating bath from metal cleaning or other metal pretreatment operation.

From the iron structure and equipment it comes from:

(e) all surfaces of tanks, pumps, pipes, and filters made of iron are in constant contact with the acidic, constantly circulated, and aerated bath dispersion;

(f) any iron surface subjected to anodic electrode conditions will actively add iron to the bath.

Much literature including many patents relating to cathodic electrocoating heretofore has suggested variously the use of mineral acids such as sulfuric, hydrochloric, and phosphoric acids as useful ionizing agents for the cathodic resin binders. Such literature also lists for such use variously many organic acids such as lactic, formic, acetic, trichloroacetic, glycolic, p-aminobenzoic, oxalic, etc., for the same purpose. The acid of choice, for example, of U.S. Pat. No. 3,617,458 is phosphoric.

This body of art does not appear to address itself to the problems of suppressing iron staining of the coating, or corrosion of the equipment. The present invention is surprisingly effective for these purposes.

STATEMENT OF THE INVENTION

One aspect of the instant invention is a process for preparing an aqueous dispersion of cathodically electrodepositable resin which exhibits, when the requisite proportion of its cationogenic sites are ionized, stable dispersion in water; this process comprises establishing requisite ionization of said resin with an aqueous solution providing sources of $C_{1-4}$ fatty acid anions and $H_2PO_4$—anions in a proportion between about 0.25:1 and about 5:1.

Another aspect of this invention is a cathodic electrocoating composition for use in coating ferrous substrates or for coating other cathodes in ferrous equipment. If comprises a stable dispersion in water of cathodically electrodepositable resin having its ionized cationogenic sites balanced by the counterions of mixed anionogen which supplies as anionic moieties $C_{1-4}$ fatty acid anions and $H_2PO_4$—anions in a proportion of about 0.25:1 to 5:1.

The cathodic resin or resin mixture in such electrocoating bath can be replenished by gradually making up depletions in it with an aqueous replenishment dispersion that is more concentrated with respect to said cathodic resin or resin mixture than is said bath.

The electrocoating process aspect of this invention comprises imposing net unidirectional electric current at about 25–500 volts between a cathode substrate and an anode joined in electrical circuit therewith by the foregoing composition diluted with water to bath strength (concentration) until a resinous deposit is applied electrically from the bath composition to said substrate.

In conventional cathodic electrocoating baths using resin having ionizable amino functionality occasionally stray or adventitious organic acids that oxidize give staining and/or corrosion problems. If follows that feeding of such bath with $H_2PO_4$—bearing neutralizer (usually to establish about 20–80% and advantageously about 50% of the total neutralization being done, the remaining neutralization being from the fatty acid), is a corrective additive for such situation. Baths operating with acids other than $C_{1-4}$ fatty acid or orthophosphoric acids can be fed with the corrective acid neutralizer for like correction, suitably compounded into a bath replenishment concentrate composition if desired.

DETAILED DESCRIPTION OF THE INVENTION

A typical resinous binder of the present cathodic electrocoating bath, and usually that is in the highest concentration of all the film-forming, non-fugitive elements present, is a single resin that provides, or a mixture of resins that provide ionizable amino and/or imino groups, typically primary, secondary or tertiary amino groups. For convenience these resins are collectively referred to herein as having ionizable "amino base" functionality. Quaternary onium salt resins also are useful resin binders here. All of these resin types of convenience can be referred to from time to time as "cathodic resins". Preferably they form films or are compounded to do so at operating bath temperature, which is usually between about 20° and about 50° C. or even higher. Various other resins, plasticizers, and solvents can be used in the compounding of the resin to assist in such film formation; then it is whole binder resin mixture rather than simply the cathodic resin that is the stuff being electrodeposited on the cathode. (Ordinarily the solvents will be baked out for curing the resin to a tack-free film.) Typical suitable cathodic resins for use in this invention are shown in the following U.S. patents and patent application:

| U.S. Pat. No. 3,617,458 | U.S. Pat. No. 3,975,251 |
| U.S. Pat. No. 3,839,252 | U.S. Pat. No. 4,025,409 |
| U.S. Pat. No. 3,891,527 | U.S. Pat. No. 4,029,561 |
| U.S. Pat. No. 3,925,181 | U.S. Pat. No. 4,035,272 |
| U.S. Pat. No. 3,935,087 | U.S. Pat. No. 4,035,273 |
| U.S. Pat. No. 3,937,679 | U.S. Pat. No. 4,035,274 |
| U.S. Pat. No. 3,947,339 | U.S. Pat. No. 4,037,018 |
|  | U.S. Pat. No. 4,096,105 |
| S.N. 689,106 filed 5/24/76 - | |
| Photocurable Cathodic Electrocoating | |

The disclosures of these patents and application are incorporated expressly herein by reference.

Cationogenic sites on such resin are those which can ionize to produce a cation. In the case of quaternary onium salt resin, the anionogen consists essentially of the mixture of counterions from such resin salt, here a mixture of $C_{1-4}$ fatty acid anions and $H_2PO_4$—anions. In the case of an amino-functional resin, the anionogen consists essentially of a mixture of $C_{1-4}$ fatty acid and orthophosphoric acid providing the anionic carboxylic acid and $H_2PO_4$—counterions which result when amino functionality is neutralized by such acids.

Frequently there is blended with such resin before dispersing it in water electrically inert (that is, nonionizable or substantially nonionizable) film-forming resin of various sorts such as a soft hydrocarbon resin; also in the binder blend for this dispersing there is often included various cross-linking materials such as ones having $\alpha,\beta$-ethylenically unsaturated carbonyl groups, resin having epoxide functionality, and various resinous amino-aldehyde condensation products, this all being very well outlined in the U.S. patent art, especially U.S. Class 204, Subclass 181. Some of the cathodic resins and additive resins blended therewith to form the paint binder even can have some acidic groups such as carboxyl groups present in such an amount to be subordinated to the ionized base functionality of the whole resinous binder so that it migrates to and deposits on the cathode; for example, such acid groups can be part of an aminoplast crosslinker or even as a part of the cathodic resin itself.

The preferred fatty acid for practice of the instant invention is acetic acid for effectiveness and economy. Formic, propionic, butyric, and isobutyric acids and mixtures of the $C_{1-4}$ fatty acids also are useful, the formic tending to disintegrate when electrolyzed. Modest proportions of various chlorinated derivatives of these acids such as mono-, di-, or trichloroacetic, and $\alpha$- or $\beta$-chloropropionic, also are permissible, but their cost is relatively high and their effectiveness not as great as acetic for the instant operations. The molar ratio of acetic acid to phosphoric acid should be between 0.25:1 and about 5:1 for truly practical electrocoating of resins with amino base functionality for giving light colors, and advantageously such ratio is between about 1:1 and 3:1.

The phosphoric acid of choice here for effectiveness and economy is orthophosphoric acid ($H_3PO_4$). Meta-, pyro-, and hypophosphoric acids also can be useful when used according to their stoichiometric equivalence to $H_3PO_4$ because they react in water to give orthophosphoric (although the reaction of hypophosphoric acid is slow, and thus it is not as advantageous to use as is the cheaper orthophosphoric).

Contact of orthophosphoric acid on iron surfaces can produce iron salts that are insoluble in water, but soluble in aqueous acidic solution, especially those having ample free orthophosphoric acid. It has been found that ferrous and ferric orthophosphate is practically insoluble in dilute aqueous acetic acid when no free phosphoric acid is present. Accordingly, it is preferred to employ a combination of acetic and orthophosphoric acid for ionizing amino base functionality so proportioned as to preclude the appearance of a substantial proportion of free orthophosphoric acid during the electrocoating operation. The other useful fatty acids recited here do not exhibit such a high degree of iron orthophosphate insolubility for this process, thus acetic acid is the acid of choice.

When ionizing amino resins, the aggregate of primary acid equivalent, that is from the fatty acid and from the first hydrogen of the phosphoric acid, should be restricted to an amount not substantially in excess of the total ionizable equivalents provided by the resin or resin mixture containing the ionizable amino base functionality. In ordinary practice, for instance of stability of the resin dispersion in the bath water, a little extra fatty acid often is present to boost such aggregate of primary acid equivalents over the total of such ionizable base functionality, this excess of acid equivalents over base equivalents amounting to about 5–10%. While it can be more, larger excesses of acid represent lower electrical efficiency in the process. They would be used only to further insure stable dispersion of the cathodic resin binder under the electrocoating conditions at all times at the expense of such efficiency sacrifice.

While a mixture of the fatty acid and phosphoric acid can be used for forming the dispersion of amino base functional resins, it is preferred to warm a mixture of such electrocoating binder resin (and customarily viscosity-reducing minor amounts of organic solvent) to about 60° C., then add to this the acetic (or other fatty acid) as a dilute, e.g. 5% solution in water with mechanical agitation; following this the temperature of the resulting mixture is raised to 65°–75° C., hold for at least about 20 minutes, then the phosphoric acid is added as an approximately 10% solution in water. This mixture is further agitated for at least about 10 minutes, then diluted with deionized water to 25–35% resin solids, and finally diluted to desired bath concentration. In this way substantial cross-linking of the resin and a large increase in viscosity of the dispersion is suppressed most effectively. This dispersion then is let down with further water until the cathodic resin in said dispersion is established at about 3–15% by weight and preferably 5–10% by weight. Where an acid-deficient replenishment composition is being made for such bath, less total primary acid equivalents are used than would be used in the coating bath, and the dispersion is not let down that far, the resin concentration being at least about 20% and usually about 25–60% by weight in the dispersion. When all the resinous binders are added to a bath of concentrate, it is usually appropriate to add pigment grind, etc., to make up the appropriate finished cathodic electrocoating bath composition or finished replenishment composition therefor.

Water soluble buffers providing $C_{1-4}$ fatty acid anions and/or $H_2PO_4$—anions often can be desirable in the aqueous dispersions of this invention. Specific useful ones are zinc acetate, zinc dihydrogen phosphate, and magnesium acetate, all these stabilized to maintain their solubility in the bath or replenishment concentrate dispersion with a little free orthophosphoric acid, or ammonium dihydrogen phosphate. Use of these metal or ammonium salts should be restricted to provide metal equivalents in a proportion fairly minor to the cationogen (base) equivalents present. Thus, zinc equivalents up to about 0.7 of the preferably a half of or less of the base equivalents from the resin can be present without destabilization and given precipitates in most cases, and even too much ammonium dihydrogen phosphate and the like will waste electric current in the electrocoating process. In general the acetates, propionates, butyrates, and dihydrogen phosphates of the ammonium ion and Group II metals having atomic number below 40 (non-chromophoric) are useful buffers when used where and in modest proportions where they do not cause precipitation. Thus, when a dihydrogen phosphate salt buffer is used, it is advisable to ionize with the free acids only 75-85% of the amino functional sites on a cathodic resin, then provide $H_2PO_4$—anion from such salt up only to the remaining base equivalents present from such resin.

The electrocoating dispersion as pointed out herebefore is usually used as a coating or paint. It can be applied to substrates such as wood, metal, plastic, etc., by brushing rolling, spraying, and other conventional methods, but primarily is for cathodic electrocoating. "Paint" for the purpose of this application is meant to include simply the cathodic resin or resins, any extender or cross-linking resins or resin-formers codispersed for codeposition with the same, and dryers, UV sensitizers or absorbers, curing catalyst, film plasticizers, solvents, anti-foam agents, pigments and/or fillers (mineral, plastic, etc.) dispersed for codeposition with such resin. The electrodeposit, and thus the "paint", also can contain tints or stains, if desired and may be considered broadly analogous to conventional varnish, lacquer, enamel, or paint.

Preferably the pigments and other solid particles to be codeposited with the cathodic resin from the bath are extremely fine, e.g., for example having average particle size not substantially in excess of 2 microns for solid particles having density of 3.5 or more, and average particle size not over about 5 microns when such pigmentation and/or fillers are less dense. If as much as about 5% and preferably not more than about 2% by weight of the solid pigment, fillers, and codepositing solid phase resins are above 10 microns in particle size, this can be tolerated without substantial sacrifice in performance, but virtually nothing should be coarser than about 44 microns for good suspension in the bath and good film appearance. As pointed out in U.S. Pat. No. 3,922,212, the pigmentary and filler solids deplete from an electrocoating bath at a different rate than the resinous binder, thus the replenishment composition usually has to reflect such disproportionation.

While the dispersion for electrocoating generally is maintained in a bath tank with the workpieces dipped therein and withdrawn therefrom, it is also, of course, possible to use a shower-type operation where the painting dispersion forms a continuous stream between its discharge point which is of anodic polarity relative to the workpiece being wetted. pH of the bath generally is maintained between about 2.5 and 7 and preferably between about 3.5 and about 6.

Useful voltages in the operation are conventional from 15 volts up to about 500 volts and higher in some cases provided, however, that the film is not ruptured because of heat generated because of large amperage flows. Accordingly, it follows that not every cathodic resin film can stand 500 volts. Advantageously the voltage is between 25 and 300, and preferably between about 50 and 200. The power should be net unidirectional (preferably straight d.c. or rectified a.c.) current flowing between anode and cathode, the cathode being the workpiece to be coated. Occasionally, particularly for intricate parts, a plurality of anodes including secondary anodes are used conventionally. Usually the freshly, still wet, electrocoated part is rinsed with water and blown with air to perfect the film; then such part is air-cured or force-cured, for example, with heat and/or UV energy, election-beam energy, or other means to yield a tack-free film. Typical baking cure temperature is 350° F. (about 177° C.) in air.

The following examples show ways in which the invention has been practiced but should not be construed as limiting the same. All temperatures are in degrees Centigrade, all parts are parts by weight, and all percentages are weight percentages unless otherwise expressly indicated.

In the following examples the electrocoating tank was made of clear acrylic plastic. It held 250 ml. of dispersion and had against one broad wall a stainless steel anode the same size as the panel being electrocoated. The anode was wired to d.c. (rectified a.c.) current from an external source. The section in which the cathode panel workpiece to be coated was dipped was 10.1 cm. deep, 9 cm. wide, and 2.6 cm. wide. To one side of this section was a weir baffle over which the aqueous bath of experimental dispersion flowed into a small chamber 2 cm. wide. The overflow of dispersion was returned to the coating chamber of the tank under the baffle to provide continuous bath circulation with a level surface clean of bubbles, froth, etc.

Such bath was maintained at 25° C. and agitated with a stainless steel agitator with a two-bladed propeller (about 2 cm. diameter) driven clockwise to pump downwardly without cavitation at about 300 rpm while it was immersed in the small chamber between the wier and the end wall of the tank. The workpieces were 7.6 cm. wide by 10.1 cm. long clean, dry, cold-rolled 20-gage steel or other metal sheets coated on the back with electrocoater's tape to expose a metal face 2½ cm. away from and parallel to the anode of the tank. Such workpieces were dipped to a depth of 8.9 cm. to coat 6.8 square decimeters thereof on the exposed face. Dipping was done automatically in about 13 seconds with power on. After a total of 60 to 90 seconds the power was shut off, and the pieces withdrawn automatically in about 13 seconds, then rinsed with water, blown with air, and force-cured to a tack-free film by drying in an oven for 20 minutes at 177° C. The voltage was constant during an electrocoating of 50, 100, or 150 d.c., and the coulombs used in each particular electrocoating were recorded. The cured panels were weighed to determine amount of coating applied. (Immersion of such cathode workpiece into and withdrawal from the bath with power on will provide even better suppression of staining of the electrodeposited film and corrosion of such workpiece.)

Accelerated corrosion testing was carried out using a rotating jar method wherein 6.8 square decimeters per liter of metal surface was exposed to constant washing with the bath dispersion under test, the exposure being in the presence of air and generated foam at 25° C. The cylindrical glass jar was 9.5 cm. tall overall by 9.5 cm. OD, and it held 180 ml. of dispersion. The jar was capped with a lid having rubber lining and sealing. Through the center of the lid was an aerating hole 0.64 cm. in diameter. The jar was mounted on its side on rollers and rotated at 18 rpm. Clean 20-gage cold-rolled steel test strips were used, these being 24 cm. long by 2.5 cm. wide; they had been washed carefully with alcohol, dried, and weighed. They are bent to conform to the interior wall of the jar at 1 cm. with one end of the strip projecting radially toward the jar center to give turbulence. These strips were sprung into place in the jar, one above the other, against the inside wall. The backs of these strips were coated with electrocoater's tape and exposed 60 square cm. each inwardly to the dispersion.

Ordinarily after three hours the upper test strip was removed from the jar and replaced by a fresh one. After another two hours the remaining strips were so removed. Upon such removal the tape was taken off the back of the strip, the strip washed carefully with water, then dried at 350° F. (177° C.) and weighed. The iron removal from the strips checked out very well with the additional soluble iron from corrosion being titrated in the dispersion.

Some tests were run this way for as long as 24 hours, but when fairly corrosive dispersions were used, most of the acidity was used up in about ten hours or a little longer. Straight dl lactic acid as the ionizing acid destabilizes the dispersion and causes precipitation of resinous solids as a film inside the jar after about ten hours; straight acetic or straight phosphoric acid takes a little longer. Of course, in such instances, excessive iron is being dissolved.

Further corrosion testing was carried out using conditions approximately normal operation of a commercial electrocoating bath having fair turnover. The electrocoating dispersion at 25° C. was recirculated by pump from a reservoir and through a section of nominally one-half inch I.D. iron pipe (1.58 cm. I.D.). The exposed area of iron surface was equivalent to 1.36 square decimeters per liter of dispersion therein. These tests checked out very well with the accelerated corrosion tests, but were run for much longer periods. Daily samples of the dispersion were analyzed for iron content. Each week a sample of the dispersion was used in an electrocoating test to check for the deposition character of the dispersion and its discoloration.

While testing on cold-rolled steel is shown in the examples, other typical ferrous substrates include, iron, various other steels, phosphate-treated steel, and zinc phosphate-treated steel. Portions of an iron substrate which are not electrocoated with paint but, nevertheless, wetted by the bath of the present invention usually take on a blue coloration indicating that a coating of iron phosphate has been laid down on them, and this itself provides some corrosion protection.

Usually a small viscosity increase results when the phosphoric acid is added, and, upon aging of the final dispersion for periods as long as a month or more, will give rise to modest viscosity increase without otherwise impairing the utility of the dispersion. Typically in the working cathodic electrocoating bath the dispersion is maintained in mechanically agitated state to suspend pigment and make for homogeneity, as well as to assist in heat transfer from electrodes and bath liquid to cooling coils or heat exchangers.

Resinous cathodic electrocoating binders having cationogenic sites on the resin (e.g., amino groups) can be neutralized completely with aqueous hydrogen chloride a value sometimes reckoned in terms of milliequivalents of such monobasic acid per 100 grams of such binder, but usually in MEQ per 100 grams of the nonvolatile portion of said binder which normally is resin. This value indicates for all practical purposes the available cationogenic sites present in the sample. Accordingly, it can be used as a reference for complete neutralization or ionization of such binder, and is so used here. Nonvolatile matter (NVM) can be measured conventionally by evaporation of a 125-250 micron thick film sample for 30 minutes at 190.6° C. and atmospheric pressure.

Stable aqueous cathodic resin dispersions are those in which the resinous binder at a working dilution of 5% binder nonvolatile matter and at a temperature of 25° C. remains in dispersed condition without agitation when at least a portion of its cationogenic sites are neutralized (that is, ionized); this so-dispersed resinous material will not precipitate in 24 hours. Advantageously, for most practical use, such stability should last for weeks and even months, and agglomeration leading to precipitation should not be evident, even then.

Requisite ionization (which also could be termed "requisite neutralization") of a particular resinous binder with a particular neutralizing agent to achieve such stable dispersion can be expressed in milliequivalents of acid in the neutralizing agent per 100 grams of binder resin solids, and it is the minimum number of such milliequivalents per said 100 grams to produce the stable dispersion. It can be only a fraction of the complete neutralization value. It will vary somewhat from resin to resin, and the solvents and other materials that are blended with such resin can influence the dispersion stability also. The largest variations in the requisite ionization value are caused by the water solubility and ionization activity of the neutralizing acid used. Very active acids such as hydrochloric show requisite values that are often only about 50% of those for complete neutralization, whereas weaker organic acids can require almost 100%.

In the following Examples, when a plurality of acids was used to make a cathodic resinous binder dispersion, such binder was agitated and dosed with an aqueous solution of the carboxylic acid, warmed to 65.6° C., stirred for 20 more minutes, then further dosed with a solution of orthophosphoric acid in water, stirred for 10 minutes, then diluted with water to obtain a stable resin dispersion. When a single acid was used for such work, the resinous binder was agitated and dosed with an aqueous solution of the single acid, warmed to 65.6° C. and further stirred, for 30 minutes then let down with water to make the dispersion.

The cathodic resinous vehicle used in the Examples 1-13 was an aminated (all secondary amino groups) epoxy melamine resinous material thinned with solvent. As produced it had approximately 78 parts of resin per 22 parts of solvent proportioned substantially as follows: 12.5 parts of 2-butoxyethanol-1; 4.2 parts of 2-hexoxyethanol-1; 1.5 parts xylol; and 4.3 parts isobutanol. When reduced with an equal volume of 2-butoxyethanol-1, the asproduced material had Gardner-Holdt viscosity at 25° C. of I. Its density was about 1 gm./cc., and the amino group value upon complete neutralization was 86 MEQ of acid per 100 gms. of nonvolatile matter. An additional 7.8 parts of 2-hexoxyethanol-1 was added to impart better flow and handling to such vehicle.

EXAMPLES 1–13

Vehicles A, B, and C, tabulated below, were ionized with acetic acid (1.5 to 5% in water) and orthophosphoric acid (4–8% in water). Vehicle D was made with acetic acid alone (5% in water). Vehicle E was made with acetic acid (1.7% in water) and orthophosphoric acid (3.9% in water). Vehicles F and G were made with lactic acid alone (8.5% in water). These vehicle mixtures were reduced with water to 25% resin solids after ionizing, then further reduced with additional water to 7.5% resin solids for testing. Similar ionization attempts using orthophosphoric acid alone tended to precipitate the resin on aging, thus such mixture was not tested. Test data were as follows the * indicating much film discoloration from Fe:

Cathodic Electrocoating Tests (100 v. on 90 sec., Bath 25° C.)

| Example No. | Vehicle Dispersion | Acid Content, meq./100 gm. of Resin, Solids Accounting for First Hydrogen of Phosphoric Acid Only | pH | Coulombs per Gram of Resin Electrodeposited |
|---|---|---|---|---|
| 1 | A | 22 acetic, 64 phosphoric | 3.5 | 94.6 |
| 2 | B | 43 acetic, 43 phosphoric | 3.9 | 93.7 |
| 3 | C | 64 acetic, 22 phosphoric | 4.2 | 91.0 |
| 4 | D | 91 acetic | 4.6 | 96.8* |
| 5 | E | 43 acetic, 43 phosphoric | 2.6 | 63.3 |
| 6 | F | 91 lactic | 3.8 | 91.8* |
| 7 | G | 73 lactic | 4.2 | (73)* (estimated) |

Using the corrosion rate of Example 10, below, as reference, the reductions in such rate for Ex. 7a, 8a, 9a, and 11 were 64%, 94%, 96% and 86%, respectively.

Corrosion Tests Rotating Jar Method

| Example No. | Vehicle Dispersion | Time of Exposure, Hours | Corrosion rate, mq. iron/dm$^2$ |
|---|---|---|---|
| 7a | A | 5 | 41.4 |
| b | A | 20 | 58 |
| 8a | B | 5 | 6.4 |
| b | B | 20 | 41 |
| 9a | C | 5 | 4.9 |
| b | C | 20 | 10.2 |
| 10 | D | 5 | 114 |
| 11 | E | 5 | 15.5 |
| 12 | F | 5 | 159 |
| 13 | G | 5 | 103 |

The 5-hour results more nearly approximate actual electrocoating service than the 20-hour tests because the amount of free acid being depleted from the more corrosive mixtures. Hence, the corrosion rate in such instances tends to diminish substantially after 7 to 10 hours in this test.

A secondary reaction was noted while running these corrosion tests. The steel panels from Examples 8 and 9 were found to have become coated with a thin layer of iron phosphate. This would indicate that the instant process phosphate treats the immersed metal surface, which normal spray phosphatizing pretreatment might not reach.

In a series of similar tests various ratios of monobasic carboxylic acid to phosphoric acid were investigated. Maximum corrosion inhibition appeared to occur when the meq. of acid per 100 grams of resin solids was 17 from the first hydrogen of orthophosphoric acid and 69 from acetic acid.

EXAMPLE 14

Corrosion Test Pumping Through Iron Pipe

In this preparation 4 parts of the cathodic resin solids used in the previous examples and 1 part of a second aminated (all secondary and tertiary amino groups) epoxy melamine resin solids (having practically the same properties except that its amino group value for complete neutralization was 132 meq. of HCl per 100 grams of nonvolatile matter, i.e. resin) blended with inert solvents and extender resin were used to make the cathodic resinous vehicle (binder). The extender resin was non-ionizing hexamethylol melamine. The vehicle blend for ionization was 59.5 parts of the mixed amino resin solids, 25.5 parts of the extender resin, and 30.7 parts solvent. This vehicle was ionized with 5% aqueous acetic acid and 10% aqueous orthophosphoric acid to give a main vehicle mixture having a ratio of 82 mols of acetic acid to 18 mols of phosphoric acid, using amounts of these respective acids for providing 43 meq. of primary acid hydrogens (75% of complete neutralization), then let down with water to 9.1% resin solids.

A pigment grinding vehicle was made from said second cathodic resin (63.4 parts diluted with 36.6 parts of solvent) which had been ionized with 5% aqueous acetic acid and 10% aqueous phosphoric acid, except that the ratio of acetic acid to phosphoric acid was equimolar and in an amount of these acids for providing 112 meq. of primary acid hydrogen equivalents (133% of complete neutralization). A pigment mixture (27% fine clay, 71% pigmentary titanium dioxide, and 1.3% carbon black) was ground with this vehicle to give a pigment paste consisting essentially of 11.1% of such cathodic resin, 6.4% of the solvent, 42% pigment, and 40.5% water and acids.

The main aqueous resin mixture, the pigment paste, and hexamethylolmelamine (extender) resin then were mixed to make a cathodic electrocoating painting bath having 6.7% cathodic resin, 2.6% extender resin, 0.25% acetic acid, 0.14% phosphoric acid, 3.8% of the solvent, 2.8% total pigments, and 83.71% water. This bath had initial pH of 4.9 and left 12% solids (non-volatile matter) when baked out at 190.6° C. The molar ratio of acetic acid to phosphoric acid was about 3:1; it was adequate to neutralize about 84% of the combined cathodic resins in the bath dispersion. The total resin to pigment ratio of this paint was 3.3:1 by weight.

The electrocoating tests on this bath were made on zinc phosphate-treated cold rolled steel panels instead of plain mild steel panels at 24° C. for 90 seconds at various voltages. The electrodeposit was cured by baking in air at 190.6° C. for 20 minutes. The fresh dispersion had the following electrodeposition characteristics:

| Voltage | Cured Film Thickness, mm | Coloration of Film |
|---|---|---|
| 100 | 0.0735 | Blue gray, no iron coloration |
| 200 | 0.1495 | Blue gray, no iron coloration |
| 250 | 0.208 | Blue gray, no iron coloration |

After 6 days' pumping a sample of the paint was withdrawn from the pumping test and solvent loss restored. The same kind of electrocoating tests were run on the sample at 200 and 250 volts with the following results:

| Voltage | Cured Film Thickness, mm | Coloration of Film |
|---|---|---|
| 200 | 0.155 | Very little color shift toward red (from iron) was noted |
| 250 | 0.208 | Very little color shift toward red (from iron) was noted |

Daily samples of the bath dispersion under pumping test were analyzed for iron content which initially was zero. The corrosion data was as follows (Note the decrease in corrosion rate after the 1st day, a 35% decrease to the average rate for 3 weeks):

| Pumping Time, Days | Iron Loss Mg/dm$^2$/day | Electrodeposited Film Characteristics |
|---|---|---|
| 1 | 20.5 | In each test the results were: |
| 7 | 14.6 | Good film, very little iron color generation |
| 14 | 11.7 | Good film, very little iron color generation |
| 22 | 14.0 | Good film, very little iron color generation |
| Average, 3 wks. | 13.4 | Good film, very little iron color generation |

The corrosion testing indicated that the first hydrogen of the phosphoric acid should constitute advantageously about 20 to 50% of the acid milliequivalents for the neutralization. While a higher phosphoric acid proportion can be used, many cathodic electrocoating resins show a tendency to gel and precipitate when such proportion is increased beyond 50%.

EXAMPLE 15

The solubility of ferric phosphate in dilute aqueous lactic and acetic acids was determined. Powdered ferric phosphate (0.5 gm.) was heated to boiling in 25 gm. of 8.5% lactic acid. The mixture was diluted for cooling with 25 gm. water, filtered, and the filtrate tested for soluble iron (which was 2.5 mg. iron solubilized per gram of the iron phosphate). By way of contrast, 0.5 gm. of such powder was heated to boiling in 21 gm. of 10% aqueous acetic acid, cooled with 26 ml. of water, and then filtered. Between 0.1 and 0.2 mg of iron was solubilized per gram of the iron phosphate. This indicated that ferric phosphate is nearly 25 times as soluble in dilute lactic acid as in dilute acetic acid, the hydroxyl group apparently promoting a sequestration or chelation of such iron salt.

EXAMPLE 16

The cathodic electrocoating resinous binder used was like that of Examples 1-13.

This solvent-reduced resin was dosed with a 5% solution of acetic acid in water, warmed to 65.6° C. and stirred for 20 minutes, further dosed with a 10% solution of orthophosphoric acid in water and stirred for 10 minutes, the dispersion then diluted with water to 25% resin solids. Using 25% of the meq. from acetic acid and 75% of the meq from the first hydrogen of phosphoric acid, sufficient acid meq was used to provide for 100% neutralization of the resin base functionality.

The resin dispersion concentrate at 25% was further diluted to 9.6% resin solids with water.

Zinc acetate in water solution containing 14% zinc acetate was used to dilute the 9.6% solids resin dispersion to 7.5% resin solids.

The final mixture at 7.5% resin solids was further stabilized by addition of an aqueous 10% solution of phosphoric acid in an amount sufficient to provide primary acid hydrogens 12.5% over and above the base functionality of the binder. In other words the "neutralization" was "112.5%".

The resulting cathodic electrocoating bath had: % resin solids 7.5%.

The following meq. based on 100 grams resin solids:

| | | |
|---|---|---|
| meq. | base from resin | 86 |
| meq. | acid from acetic acid | 22 |
| meq. | acid from 1st hydrogen of phosphoric acid, first dosing | 64 |
| meq. | Zinc from Zinc acetate | 41 |
| meq. | acetate anion from Zinc acetate | 41 |
| meq. | acid from 1st hydrogen of phosphoric acid used for stabilization | 11 |

Bath pH initially was 3.8, and it had electrical specific resistance of 640 ohm-cm. at 25° C. When the resin was electrodeposited on a steel cathode at 100 volts for 90 seconds, the energy used was 134 coulombs per gram of cured deposit, and the electrodeposited film had no discernible discoloration from iron.

In the rotating jar corrosion test for 5 hours the corrosion in terms of mg. iron/dm.$^2$ was 4.9.

EXAMPLE 17

The cathodic electrocoating resin dispersion concentrate at 25% resin solids was like that of Example 16, except that it was made up using 50% of the meq. from acetic acid and 50% of the meq. from the first hydrogen of phosphoric acid in an amount sufficient for 83% neutralization of the base resin functionality.

The resulting 25% resin solids dispersion was further diluted with water to 8.3% resin solids, and there finally was added aqueous 7.2% magnesium acetate solution to reduce the resin solids to 7.5%.

The resulting electrocoating bath had 7.5% resin solids and the following meq., based on 100 grams of resin solids:

| | | |
|---|---|---|
| meq. | base from resin | 86 |
| meq. | acid from acetic acid | 36 |
| meq. | acid from first hydro- | |

|     |                              |      |
| --- | ---------------------------- | ---- |
|     | gen of phosphoric acid       | 35   |
| meq. | magnesium from magnesium acetate | 21.5 |
| meq. | acetate anion from magnesium acetate | 21.5 |

Bath pH initially was 4.55, and it had specific electrical resistance of 750 ohm-cm. at 25° C. When the resin as electrodeposited on a steel cathode at 100 volts for 90 seconds, the energy used was 89 coulombs/gram of cured deposit, and the electrodeposited film had no discernible discoloration from iron.

In the rotating jar corrosion test for 5 hours the corrosion in terms of mg. iron/dm.$^2$ was 2.45.

EXAMPLE 18

The cathodic electrocoating resin dispersion concentrate at 25% resin solids was like that of Example 16 except that it was made up with 50% of the meq. from acetic acid and 50% of the meq. from the first hydrogen of phosphoric acid in an amount sufficient for 80% neutralization of the base resin functionality.

The 25% resin solids dispersion was further diluted with water to 10.7% resin solids, and finally adding aqueous 0.61% ammonium dihydrogen phosphate solution to reduce the resin solids to 7.5%.

A 10% buffer solution of ammonium dihydrogen phosphate was prepared as a mixture of 28 parts ammonium hydroxide, (30% $NH_3$), in 57 parts water and 490 parts of 10% aqueous orthophosphoric acid.

The resulting electrocoating bath had initial pH of 3.7, 7.5% resin solids, and the following meq. based on 100 grams of resin solids:

|      |                               |      |
| ---- | ----------------------------- | ---- |
| meq. | base from resin               | 86   |
| meq. | acid from acetic acid         | 34   |
| meq. | acid from first hydrogen of initially used $H_3PO_4$ | 34 |
| meq. | $NH_4^+$                      | 21.5 |
| meq. | $H_2PO_4$ —*acid from 1st hydrogen of $H_3PO_4$ used in ammonium salt* | 21.5 |
|      | initial specific resistance at 25° C., ohm-cm. | 942 |

Upon electrodeposition at 100 volts for 90 seconds on a steel cathode it took 93 coulombs of electrical energy per gram of cured resin deposited. There was much gas generation, which gave a rough film, but no discernible discoloration of the film from iron.

EXAMPLE 19

The cathodic electrocoating resinous binder used was like that of Examples 1-13.

This binder was dosed with a 5% solution of acetic acid in water, warmed to 65.6° C. and stirred for 30 minutes; the dispersion thus formed was then diluted with water to 35% resin solids.

This dispersion contained sufficient meq. from acetic acid to provide for 100% neutralization of the resin base functionality.

The 35% resin dispersion was further diluted with water to 10.7% resin solids, and with agitation a 15.9% solution of zinc dihydrogen phosphate (solubilized with a 0.15 part of orthophosphoric acid per part of the zinc salt) was added to reduce the resin solids of the final mixture to 7.5%.

The final bath had per 100 grams of resin solids:

|      |                                  |     |
| ---- | -------------------------------- | --- |
| meq. | base from resin                  | 86  |
| meq. | acid from acetic acid            | 86  |
| meq. | zinc from zinc salt              | 41  |
| meq. | acid from 1st hydrogen of $H_3PO_4$ *in salt* | 41  |
| meq. | acid from 1st hydrogen of $H_3PO_4$ *as salt solubilizer* | 8 |
|      | pH at 25° C. initial             | 3.9 |
|      | specific resistance ohm-cm. at 25° C. | 600 |

When coating was electrodeposited at 100 volts for 90 seconds on a steel cathode the energy used was 106 coulombs per gram of cured deposit. The deposited film had no discernible discoloration from iron.

In the rotating jar corrosion test for 5 hours the corrosion in terms of mg. of iron per dm$^2$ was 3.3 mg.

From this work with film-forming resin having ionizable amino functionality sufficient for making it up into a stable aqueous cathodic electrocoating bath, related resinous mixtures have other ionized cationogenic sites were considered for the same electrocoating purposes (suppression of iron staining and iron corrosion), specifically quaternary onium salt resins having as their satisfying anions (anionogens, which in this case are counterions to the resin ions present) a controlled proportion of dihydrogen phosphate anions and $C_{1-4}$ fatty acid anions (preferably acetate) typically to provide acetate or like anion equivalents (e.g. $CH_3COO)^{31}$ to phosphate $(H_2PO_3)^-$ equivalents in a proportion of about 0.25:1–5:1 and preferably about 1:1 to about 3:1. The dispersion stability of these aqueous systems often can be enhanced with a very small amount of free fatty and/or orthophosphoric acid present in the dispersion, e.g. 2–15% of acetic acid equivalents in excess of the cationogenic equivalents present. Similarly to its aminofunctional resin counterpart, the resulting aqueous composition, often referred to as being one of "solubilized" resin, is a complex solution, dispersion, suspension, or a combination of one or more of these acting as an electrolyte; it will serve when compounded in accordance with invention principles to suppress iron staining of the electrodeposited film and corrosion of ferrous substrates and equipment. While it is known that the electrical conductivity of films from electrodeposition of certain resinous quaternary ammonium salts can be sufficiently high to give no practical "shut-down" of electric current and, thus, the electrodeposition of coating, such operations can be terminated when the desired electrodeposit is made. Quaternary onium (ammonium, sulfonium, and phosphonium) salt resins then can be adaptable to this invention. U.S. Pat. Nos. 3,839,252, 3,937,679 and 3,935,087 are representative of this group.

EXAMPLES 20–23

In these examples the binder used was like that of Examples 1-13. The ultimate resin solids (NVM) content of the aqueous bath dispersion made was 7.5% in each case. In Example 20 neutralization was 100%, and it was done with 86 meq. of acetic acid alone per 100 grams of resin solids. Initial pH was 4.1. In Example 21 neutralization was 100%, and it was done with 86 meq. of acetic acid per 100 grams of resin solids, but there was added also ammonium dihydrogen phosphate buffer which provided the electrocoating dispersion with 21.5 meq. $NH_4+$ cation and 21.5 meq. of $H_2PO_4-$ anion, both values per 100 grams of resin solids. Initial pH was 3.7. In Example 22 the neutralization was 100% plus 6% free acidity in excess of the base equivalents of resin (meq. base per 100 grams of resin solids, 86), this being done with 73 meq. of lactic acid and 18 meq. of phosphoric acid, counting, of course, only the first phosphoric acid hydrogen, both values being per 100 grams of resin solids. In Example 23 the neutralization of the base resin was complete with 86 meq. of lactic acid per 100 grams of resin solids. In addition to that there was added to the solution a buffer of acidified zinc dihydrogen phosphate providing 42 meq. zinc cation, 42 meq. $H_3PO_4-$ anion, and 9 meq. acid attributable to the first hydrogen of the phosphoric acid used to maintain solubility of such zinc dihydrogen phosphate, all these values being per 100 grams of resin solids.

Steel cathodes were electrocoated from the several exemplary 7.5% solids dispersions using 100 volts for 90 seconds. In addition, like 7½% solids dispersions were tested for 5 hours using the rolling jar corrosion test. The results of these tests are tabulated below:

| Example No. | Spec. Resistance Ohm-cm. @ 25° C. | Coulombs per gram of Resin Electro-deposited | Electro-coating Remarks | 5 hour corrosion mg./dm$^2$ |
|---|---|---|---|---|
| 20 | 1035 | 79 | Discernible discoloration from iron | 176 w/dispersion reddened |
| 21 | 675 | 110 | much gas generated, film rough, slight discoloration from iron | 5.4 |
| 22 | | 172 | | 98 |
| 23 | | 158 | | 64 |

When propionic acid was substituted for acetic acid in tests otherwise run essentially the same as those of Examples 2, 3, 8a and 9a, the results were, for all practical purposes, about the same as in those examples. When the problem of establishing a quaternary ammonium resin bath dispersion in accordance with the instant invention was considered, it was judged most expedient to dose a dilute aqueous dispersion of such resinous acetate with dilute aqueous phosphoric acid to give free acidity from its primary hydrogen atoms of about 25% of the acetate equivalents present, then make the operating electrocoating bath up with the corresponding resinous hydroxide of less aqueous dilution and very small amounts of dilute acetic and phosphoric acids.

What is claimed is:

1. In a cathodic electrocoating process wherein cathodic resin is in aqueous bath dispersion by virtue of at least requisite neutralization of its ionizable amino base functionality with one or more acids that are neither a $C_{1-4}$ fatty acid nor phosphoric acid, the improvement for correcting iron staining of the coating and/or corrosion of ferrous bath equipment which comprises:

adding to said bath dispersion, as at least a portion of the makeup material thereto, sufficient $C_{1-4}$ fatty acid and phosphoric acid to establish a molar ratio of said fatty acid anions to $H_2PO_4-$ anions in said bath dispersion between about 1:1 and about 3:1 while restricting the aggregate of free primary acid equivalents therein to not more than about 25% of that needed for complete neutralization of said cathodic resin.

2. An electrocoating process having improved resistance to iron staining which comprises imposing net unidirectional electric current at about 25-500 volts between a cathode substrate and an anode joined in electrical circuit therewith by an aqueous cathodic electrocoating bath comprising a stable dispersion in water of cathodically electrodepositable resin having its ionized cationogenic sites substantially balanced by the counter ions of mixed anionogen which supplies as anionic moieties $C_1$-$C_4$ fatty acid anions and $H_2PO_4-$ anions in an equivalents proportion of about 0.25:1 to about 5:1, until a resinous deposit is applied electrically from said composition to said substrate.

3. In a cathodic electrocoating process having improved resistance to iron staining wherein a dispersion of cathodically electrodepositable resin which exhibits, when the requisite proportion of its cationogenic sites are ionized, a stable dispersion in an aqueous medium, the improvement for correcting iron staining of a coating electrodeposited from such dispersion which comprises adding to said dispersion $C_1$-$C_4$ fatty acid anions and $H_2PO_4-$ anions in an equivalents proportion between about 0.25:1 and about 5:1, the aggregate of primary acid equivalents from said fatty acid and from said first hydrogen of the phosphoric acid being restricted to an amount not substantially in excess of the total amount of base equivalents provided by said resin.

4. In a cathodic electrocoating process having improved resistance to iron staining wherein a dispersion of cathodically electrodepositable resin which exhibits, when the requisite proportion of its cationogenic sites are ionized, a stable dispersion in an aqueous medium, the improvement for correcting iron staining of a coating electrodeposited from such dispersion, which comprises adding to said dispersion $C_1$-$C_4$ fatty acid anions and $H_2PO_4-$ anions in an equivalents proportion of about 0.25:1 to 5:1, the aggregate of primary acid equivalents from said fatty acid and from said first hydrogen of the phosphoric acid being substantially balanced by the base equivalents provided by said resin.

5. The process of any of claims 2, 3, or 4 wherein the resin has ionizable amino-base functionality, and $H_2PO_4-$ anions are provided by orthophosphoric acid.

6. The process of any of claims 2, 3, or 4 wherein the $C_1$-$C_4$ fatty acid is acetic acid, $H_2PO_4-$ anions are provided by orthophosphoric acid, the molar ratio of acetic acid to orthophosphoric acid present is between about 1:1 and about 3:1, and the aggregate of primary acid equivalents from said acetic acid and from the first hydrogen of the orthophosphoric acid is restricted to an amount not substantially in excess of the total amount of base equivalents provided by said resin.

7. The process of any claims 2, 3, or 4 wherein there is a water soluble buffer present in a minor proportion relative to the resinous base equivalents present, said buffer being at least one ammonium or Group II metal acetate, propionate, butyrate, isobutyrate or dihydrogen phosphate, there being free orthophosphoric acid present in a proportion adequate for maintaining the buffer soluble in the aqueous dispersion.

8. The process of any of claims 2, 3, or 4 wherein there is present a water soluble buffer in minor proportion relative to the resinous base equivalents present, said buffer being zinc acetate, zinc propionate, zinc butyrate, zinc isobutyrate or zinc dihydrogen phosphate, there being free orthophosphoric acid present in a proportion adequate for maintaining the buffer soluble in the aqueous dispersion, and the $C_1$-$C_4$ fatty acid is lactic acid.

* * * * *